May 25, 1926.
G. WALKER
SHIP'S INSTRUMENT
Filed Jan. 29, 1919
1,586,432
7 Sheets-Sheet 5
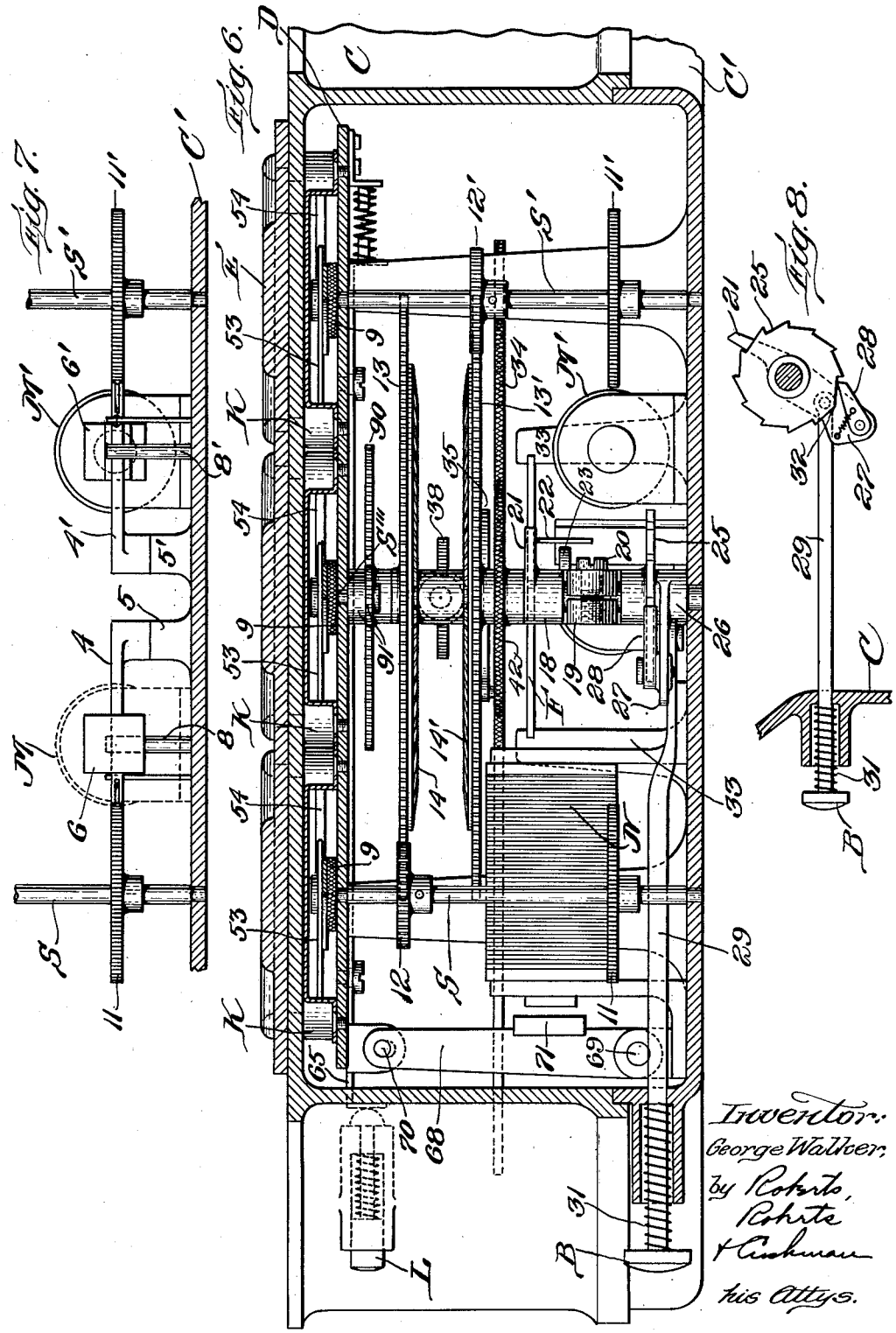

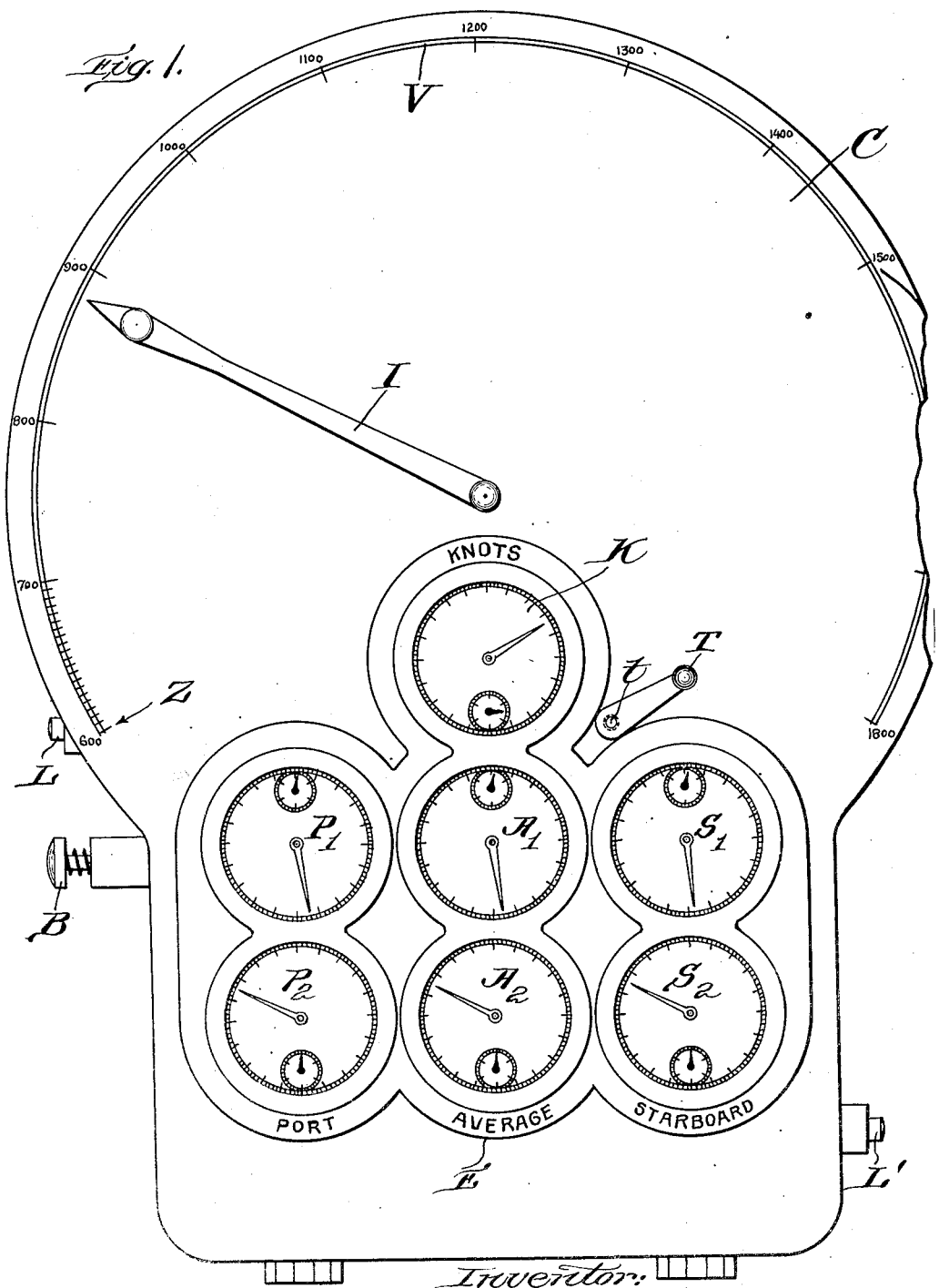

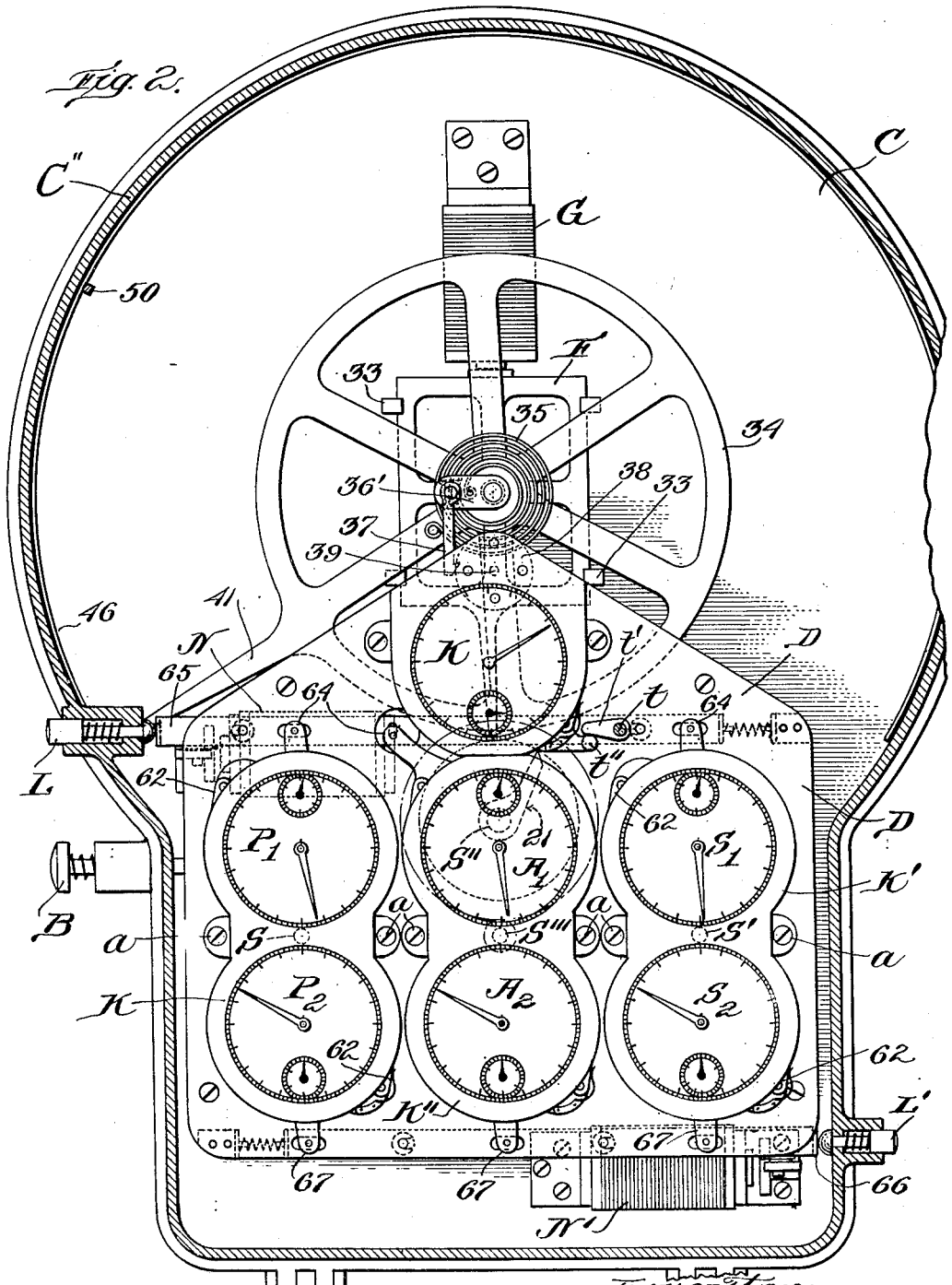

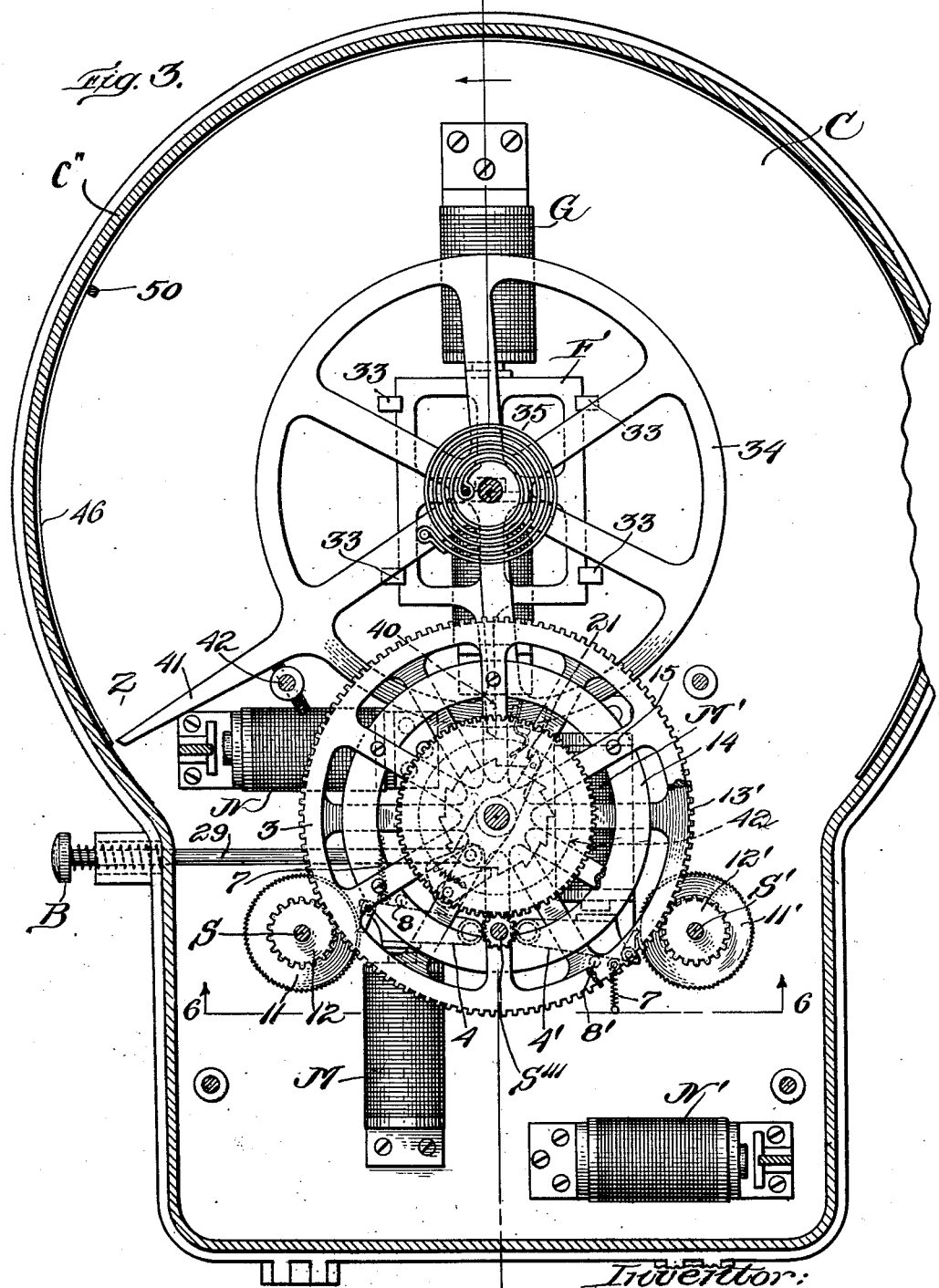

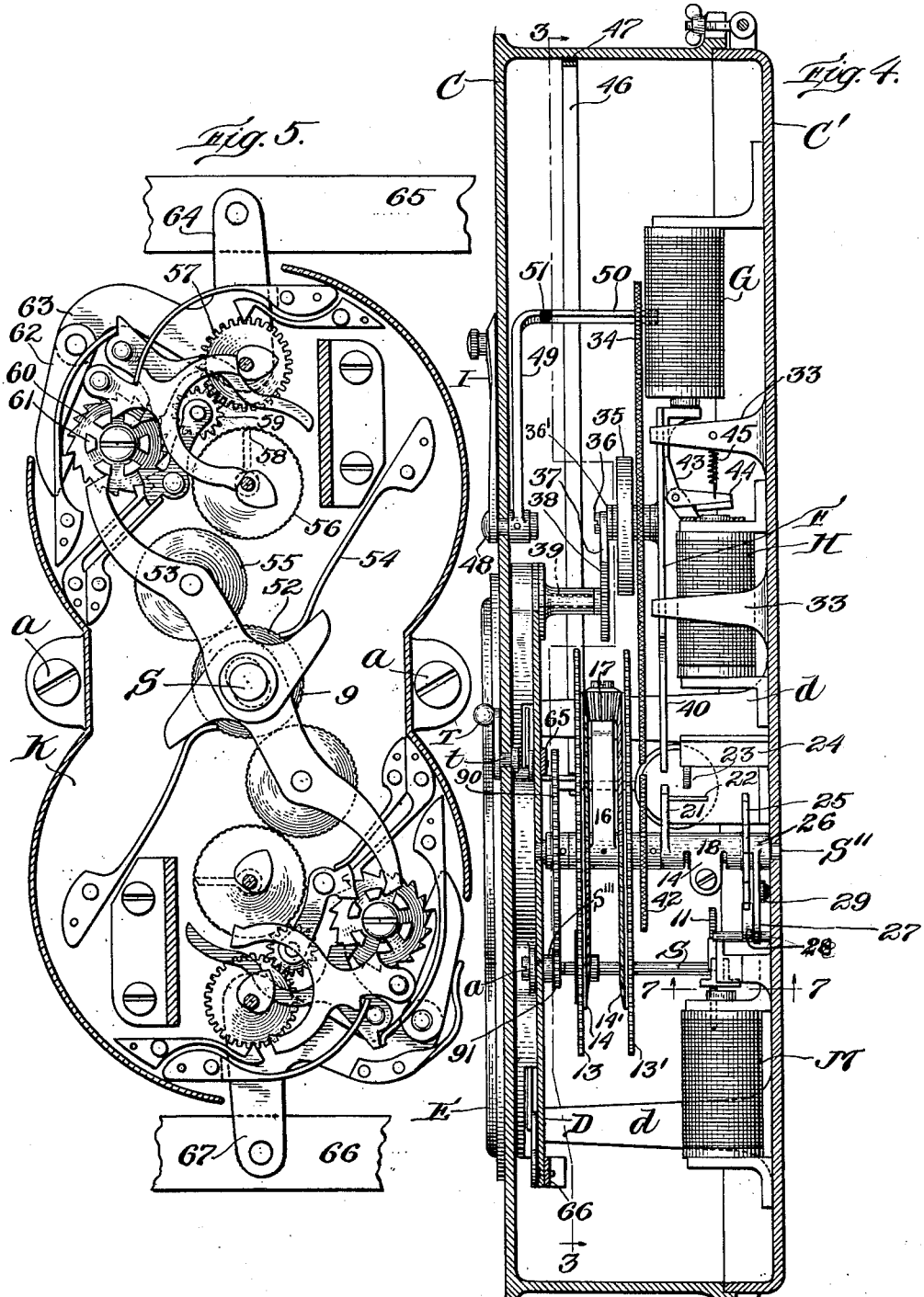

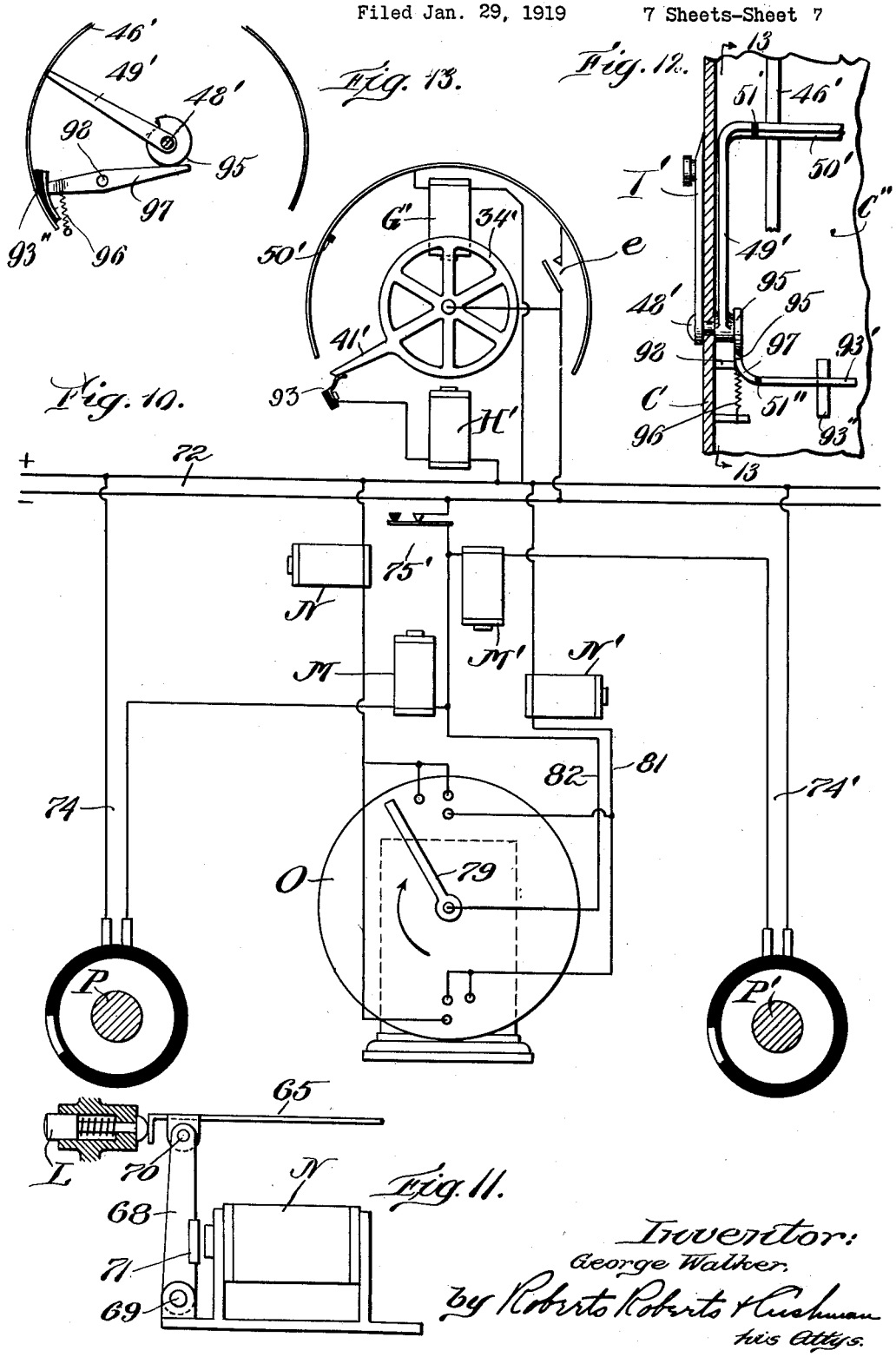

Patented May 25, 1926.

1,586,432

UNITED STATES PATENT OFFICE.

GEORGE WALKER, OF NEWTON CENTER, MASSACHUSETTS.

SHIP'S INSTRUMENT.

Application filed January 29, 1919. Serial No. 273,744.

This invention relates to instruments adapted to measure either the velocity of a moving body or the distance traveled from a predetermined point, and more particularly to an instrument adapted to measure the distance traveled by a ship, the velocity of each ship propeller, and the average velocity of the various propellers.

There is a peculiar difficulty presented in accurately measuring the velocity of a ship for the reason that the ratio between the velocity of the ship and the rate of revolution of the propeller or propellers is not constant. For example, a particular ship may be driven 5 knots when the propeller is rotating at 74 revolutions per minute, requiring 888 revolutions per knot, while in order to drive the ship 20 knots it may be necessary to drive the propeller at 294 revolutions per minute, requiring 882 revolutions per knot. If this ratio were constant it would merely be necessary to measure the rate of revolution of the propeller or propellers and the velocity of the ship would be proportional thereto so that the instrument might be calibrated in terms of ship velocity. In the case of a ship having two or more propellers the difficulty is still further increased due to the fact that it is practically impossible to maintain the propellers at precisely the same angular velocity.

The object of the present invention is automatically to indicate either the velocity of a ship or the distance traveled by a ship at different velocities, to provide means for adjusting the functional relationship between the propeller and the indicating means for various ship velocities, to provide means for indicating the average velocity of a plurality of propellers, and to provide means for indicating the distance traveled by a ship which is adjustable to the different number of average revolutions required to drive a ship a certain distance at different velocities. In the accompanying drawings which illustrate the preferred embodiment of my invention,—

Figure 1 is a front elevation of the instrument;

Fig. 2 is a front view of the instrument with the front wall of the casing cut away;

Fig. 3 is a vertical section of the instrument looking rearwardly from approximately the plane 3—3 in Fig. 4;

Fig. 4 is a vertical section of the instrument looking to the left from the central plane 4—4 in Fig. 3, the parts in the central plane being shown in elevation;

Fig. 5 is an enlarged detail view of the revolution counter mechanism hereinafter described, the view being a rear elevation with the casing for the mechanism shown in section;

Fig. 6 is a horizontal section of the complete instrument approximately on the line 6—6 of Fig. 3.

Fig. 7 is an enlarged detail section on the line 7—7 of Fig. 4, parts being omitted;

Fig. 8 is a detail in plan of the setting mechanism shown at the bottom of Fig. 6, parts being shown in section;

Fig. 10 is a diagram showing a slightly modified circuit arrangement;

Fig. 11 is a side elevation of one of the combined manual and magnetic means for controlling the revolution counters of the instrument, and Figs. 12 and 13 are detail views illustrating a modification.

Figure 9:
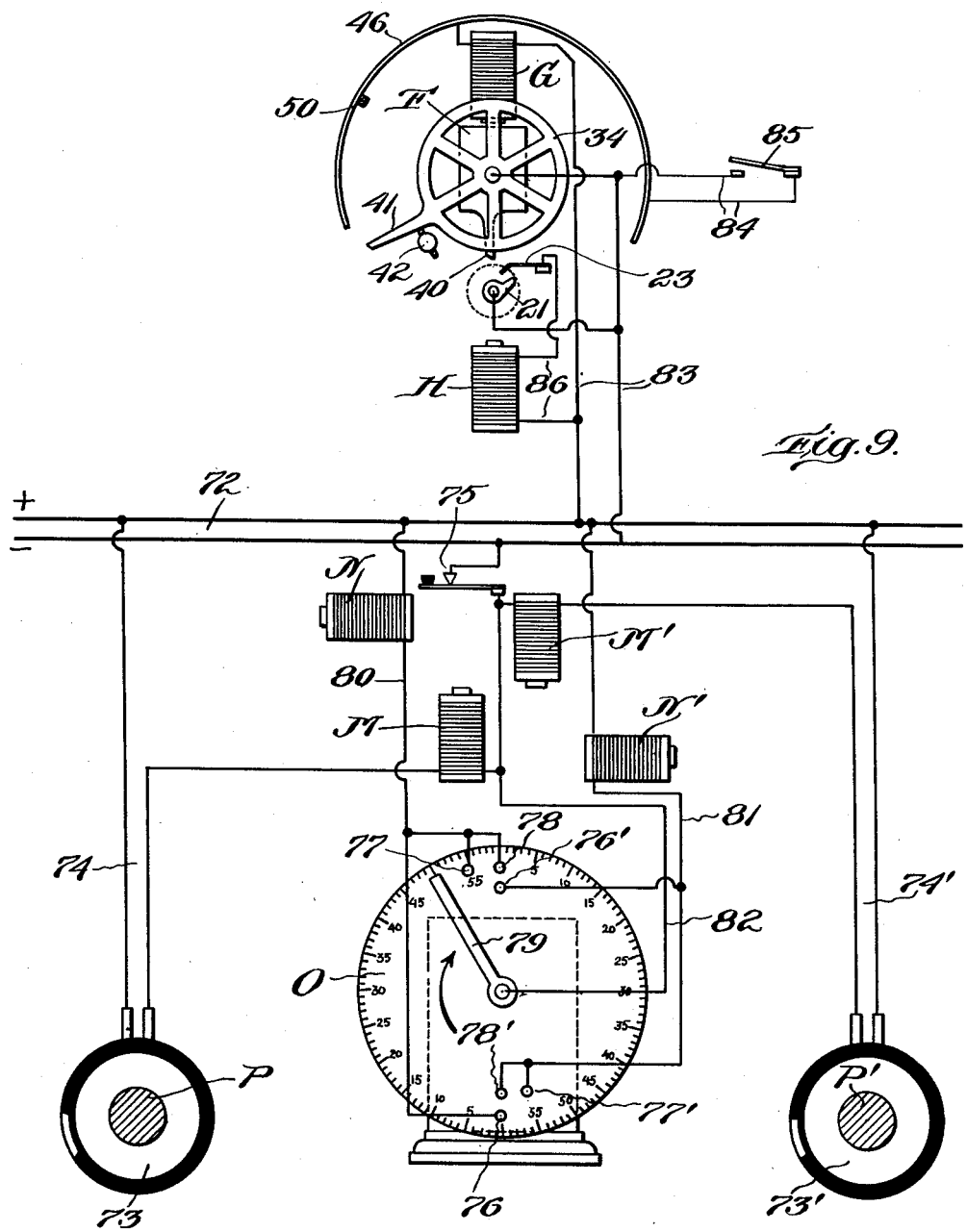
Fig. 9 is a diagrammatic view of the electrical circuit arrangement of the system.

Inasmuch as the present invention is particularly adapted to be employed on ships I shall describe it with reference to such use. However, in certain of its aspects the invention is adapted to be employed elsewhere, as e. g. on aircraft and even on ground vehicles, and the claims are therefore not to be construed to be limited to a ship's instrument merely because I have chosen to describe the invention as applied to ships. Moreover, while I have illustrated an instrument adapted to be used on a ship having two propellers it is to be understood that the instrument may be arranged to be used on a ship having any number of propellers.

The particular embodiment of my invention illustrated in the drawings comprises, in general, propeller speed-controlled mechanism operative in proportion to the speed of each propeller, average speed-controlled mechanism operative in proportion to the average speed of all of the propellers, an indicator operated by the second mechanism to indicate the distance traveled, and a plurality of indicators to indicate the speed of each propeller and the average speed of all the propellers. Owing to the fact that the ratio between the average speed of the propellers and the distance traveled by the ship varies with the velocity of the ship I interpose adjustable means between the average speed-controlled mechanism and the distance indicator whereby the operative relationship therebetween may be adjusted to the speed of the ship so that the distance indicator will accurately indicate the distance traveled at any speed of the ship.

The aforesaid speed indicators may be of any suitable type but I preferably employ indicators each of which comprises a pair of revolution counters. Thus a pair of counters is associated with each of said propeller speed-controlled mechanisms and another pair of counters is associated with said average speed-controlled mechanism. When employing indicators of this type automatic means is provided alternately to connect the counters of each pair to the associated speed-controlled mechanism. Thus I provide a chronometer to connect one counter of each set for a minute, then simultaneously to disconnect the said counters and to connect the other counter of each set for a minute, and so on, the counters being automatically reset, i. e., returned to zero position, by the chronometer a moment prior to being set in motion. In this way one counter of each set counts revolutions during one minute while the other counter of each set counts revolutions during the next minute, and so on, the first counters remaining in indicating position during the advancement of the second counters and being reset only a moment prior to being set in motion again, and vice versa, so that the indicators always indicate the number of revolutions of each propeller and the average number of revolutions during the preceding minute.

Referring more particularly to the drawings, Fig. 1 shows in front elevation the preferred embodiment of my indicating instrument which has seven indicating dials, this instrument being adapted for use on a ship having two propellers. Dial K indicates knots, $P_1$ and $P_2$ alternately count the revolutions of the port propeller, $S_1$ and $S_2$ alternately count the revolutions of the starboard propeller, and $A_1$ and $A_2$ alternately count the average number of revolutions of the two propellers. Indicators $P_1$, $S_1$ and $A_1$ operate during one minute while indicators $P_2$, $S_2$ and $A_2$ operate during the next minute and so on alternately.

The casing of my instrument comprises a front portion C and a rear portion C' hinged together at the bottom and arranged to be detachably secured together at the top as illustrated in Fig. 4. A short distance behind the front wall C and parallel to the front wall is a plate D, this plate being shown in elevation in Fig. 2. The plate D is mounted on the rear wall C' of the casing by means of a plurality of brackets $d$. The indicators K, $P_1$, $S_1$, $A_1$, $P_2$, $S_2$ and $A_2$ are mounted on the forward face of the plate D and are visible through openings in the front wall C as shown in Fig. 1. A cover E is mounted on the front of the wall C over the indicator openings and glass windows are preferably mounted in the cover E. A plurality of shafts S, S' and S'' extend horizontally between the plate D and the rear wall C', these shafts being journaled at their opposite ends in the plate D and wall C'. Fast on the shafts S and S' are ratchet wheels 11 and 11' and pinions 12 and 12'. The shafts S and S' are arranged to be driven by the ratchet wheels through mechanism hereinafter described at angular velocities proportional to the velocities of the port and starboard propellers. Loosely mounted on shaft S'' are two gear wheels 13 and 13' meshing respectively with the pinions 12 and 12'. On the opposing faces of the gear wheels 13 and 13' are mounted beveled gears 14 and 14' by means of screws 15 (Fig. 3). Fast on shaft S'' between the gear wheels 13 and 13' is an arm 16 carrying at its outer end a beveled pinion 17 which meshes on its opposite sides with the beveled gears 14 and 14' (Fig. 4). Thus the shaft S'' is driven by the gears 13 13' through the beveled gears 14 and 14' and pinion 17. If the gears 13 and 13' rotate at the same angular velocity the arm 16 will be carried around at the same velocity. However, if one of the gears 13 and 13' is driven faster than the other the pinion 17 will rotate on the end of arm 16, creeping rearwardly over the beveled gear 14 of the more rapidly rotating gear 13 and creeping forwardly over the beveled gear 14' of the more slowly rotating gear 13'. By virtue of this differential action the arm 16 will be rotated at a velocity equal to the average velocity of the gears 13 and 13'. Consequently the shaft S'' is at all times rotated at a velocity equal to the average velocity of the shafts S and S'.

On the rear end of shaft S'' is mounted a sleeve 18. This sleeve is slit longitudinally on its lower side throughout its central portion as shown in Fig. 6 and a pair of lugs 19 extend downwardly on each side of the slit. The sleeve is also divided circumferentially through 180° on each side of the lugs 19. A screw 20 passes through one of the lugs 19 and is threaded into the other lug. By varying the position of the screw the friction between the sleeve 18 and the shaft S'' may be varied. The sleeve 18 carries at its forward end an arm 21 which in turn carries a pin 22 adapted to contact with a spring 23 mounted on a bracket 24 at one point in the rotation of the sleeve. On the rearward end of the sleeve 18 is rigidly mounted a ratchet wheel 25 and immediately behind the ratchet wheel 25 is loosely mounted a collar 26. On the collar 26 is mounted an arm 27 carrying a spring-pressed pawl 28 adapted to engage the teeth of the ratchet wheel 25. A rod 29 extends from the arm 27 outwardly through the left-hand side of the casing C to a button B which is pressed outwardly by a spring 31. By repeatedly pressing inwardly on the button B the sleeve 18 may be rotated on the shaft S'' by means of the ratchet wheel 25 and pawl 28. The ratchet wheel 25 has one blank space 32 so that when the sleeve is rotated into the position where arm 21 extends vertically upwardly the sleeve can be advanced no farther by means of the pawl and ratchet mechanism.

Immediately above the sleeve 18 and in the transverse plane of arm 21 a carriage F is arranged to slide vertically in guides 33 extending forwardly from the rear wall C'. The carriage F is arranged to be lifted into its uppermost position, shown in Fig. 4, by means of a magnet G and is arranged to be held in this position by means of a catch 43. The catch 43 is provided with a lateral arm 44 upon which is mounted the armature of an electro-magnet H, a spring 45 being provided normally to hold the catch in the holding position shown in Fig. 4. Thus when the magnet G is energized the carriage is lifted into its uppermost position and there held by catch 43 until the magnet H is energized, whereupon it is permitted to drop into its lowermost position.

Extending forwardly from the center of the carriage F is a shaft 36 upon which is loosely mounted a friction gear 34, a coil spring 35 being secured at one end to the gear and at the other end to the shaft 36 so as to tend to rotate the gear in a counter-clockwise direction (Fig. 3). Extending downwardly from a lateral arm 36' fast on the forward end of the shaft 36 is a pawl 37 adapted to engage a ratchet wheel 38 fast to a shaft 39 which drives the knot counter K. Extending downwardly from the carriage F is an arm 40 which extends into the path of the arm 21 on sleeve 18 when the carriage F is in its lowermost position. Extending outwardly from the periphery of the gear 34 is an arm 41 extending into close but spaced relationship to the inner periphery of the circular portion of the casing C. An adjustable stop 42 is provided to limit the counter-clockwise rotation of the gear 34. The periphery of the gear 34 is knurled and fast on shaft S'' is a similar but smaller knurled gear 42, the knurled peripheries of the two gears being adapted to engage when the carriage F is in its lowermost position. The knurled peripheries of the two gears function as small gear teeth so that the gear 34 is driven by the gear 42 when the two gears are in contact.

On the inner periphery of the circular portion of the casing C is mounted an electrical conducting ring 46, the ring 46 being insulated from the casing by a ring of insulation 47. In the front cover C a shaft 48 is journaled in alinement with the shaft 36. On the outer end of the shaft 48 is fast a pointer I, and on the inner end of the shaft is fast an arm 49 having a lateral portion 50 which is insulated from the radial portion of the arm at 51, and which is adapted to contact with the conducting ring 46 in all positions of the pointer I. The portion 50 extends rearwardly past the plane of the gear 34 so as to cross the path of the arm 41 on the gear.

Each of the indicators $P_1$, $A_1$, $S_1$, $P_2$, $A_2$, and $S_2$ comprise mechanism similar to stop-watch mechanism for connecting the pointers of the indicators to the aforesaid speed-controlled shafts. As illustrated in Figure 5, this mechanism is comprised as follows: On the central speed-controlled shaft S is fast a friction gear 52 which is rotated continuously. Loosely mounted on said shaft immediately in front of the friction gear 52 is an arm 53 which is normally urged in a clockwire direction by a spring 54. Rotatably mounted on arm 53 in contact with friction gear 52 is a second friction gear 55 adapted to be continuously rotated by the gear 52. In juxtaposition to the gear 55 is a third friction gear 56 which is fast to the shaft carrying the large pointer of the indicator. Immediately above the gear 56 is a gear wheel 57 fast on a shaft which carries the small pointer of the indicator. The gear 57 is arranged to be advanced one step for each revolution of the gear 56 by means of an arm 58 arranged to engage a tooth of the intermediate gear wheel 59. When the arm 53 is swung in a clockwise direction about the driving shaft until the gear 55 engages the gear 56, the speed-controlled shaft S is operatively connected to the pointers of the revolution counter through the gears 52, 55, 56, arm 58 and gears 57 and 59.

The mechanism for stopping, starting and resetting the pointers of the revolution counter is precisely the same as that commonly employed in stop-watches, and a detailed description thereof will not be necessary. Suffice it to say that this mechanism is controlled by a ratchet wheel 60 carrying spaced projections 61 on one side thereof. This ratchet wheel is arranged to be stepped around by a pawl 62 mounted on one end of a bell-crank 63. The bell-crank is pivotally mounted on the casing in its central region and at its other end 64 is pivotally connected to a bar 65. When the bar 65 is moved to the right the ratchet wheel 60 is advanced one step. When the bar 65 is moved to the right to advance the ratchet wheel 60 the first step the indicator pointers are operatively connected to the shaft S and the indicators begin to count the revolutions of the shaft S. When the bar 65 is moved to the right a second time the ratchet wheel 60 is advanced a second step and the indicator pointers are disconnected from the driving shaft S. The pointers are returned to zero position by moving the bar 65 to the right a third time.

The mechanism at the top of Fig. 5 is duplicated at the bottom of the figure, the upper set of mechanism being associated with one of the indicators $P_1$, $A_1$ and $S_1$, and the lower mechanism being associated with the corresponding one of the lower indicators $P_2$, $A_2$ and $S_2$. The mechanism at the bottom of Fig. 5 is controlled in the same way as the mechanism at the top of the figure, namely, by an oscillatory bar 66 pivotally connected to a bell-crank 67 corresponding to the upper bell-crank 63.

The central driving gear 52 of the counter mechanism associated with indicators $P_1$ and $P_2$ is connected to the forward end of the shaft S which is driven at a rate proportional to the rate of revolution of the port propeller. The central driving gear 52 associated with the indicators $S_1$ and $S_2$ is connected to the forward end of the shaft S' which is driven at a rate proportional to the velocity of the starboard propeller. And the central driving gear 52 of the indicators $A_1$ and $A_2$ is connected to the forward end of the shaft S''' which is driven by shaft S'' through the medium of gears 90 and 91 at a rate proportional to the average velocity of the port and starboard propellers.

A double set of mechanism such as illustrated in Fig. 5 is associated with each of the pairs of indicators $P_1$—$P_2$, $S_1$—$S_2$ and $A_1$—$A_2$, the bars 65 and 66 extending continuously across the instrument and connecting to the mechanism of each pair of indicators by means of bell-cranks such as bell-cranks 63 and 67 illustrated in Fig. 5. The bars 65 and 66 are mounted on the rear face of plate D and are connected to the bell-cranks 64 and 67 by means of pins extending through horizontal slots in the plate D. The bar 65 extends out to the left-hand side of the instrument and is there associated with the push button L as illustrated in Fig. 2. The bar 66 extends out to the right-hand side of the casing and is there associated with a push button L' similar to the button L. By repeatedly pressing inwardly on the button L the instruments $P_1$, $A_1$ and $S_1$ may be started, stopped and reset manually. By repeatedly pressing inwardly on the button L' the instruments $P_2$, $A_2$ and $S_2$, may be started, stopped and reset in a similar manner. The bars 65 and 66 are also arranged to be actuated automatically by magnets N and N' respectively. The connection between magnet N and bar 65, as illustrated in Figs. 6 and 11, comprises an arm 68 pivotally mounted on the rear wall of the casing at 69 and pivotally connected to a lug on the bar 65 at 70. An armature 71 is mounted on the arm 68 in alinement with the magnet N so that when the magnet is energized the arm 68 is rocked to oscillate the bar 65. Thus by repeatedly energizing the magnet N the instruments $P_1$, $A_1$ and $S_1$ may be started, stopped and reset as by repeatedly pressing the button L. The magnet N' is associated with the bar 66 in the same manner as the magnet N is associated with the bar 65 so that repeated energizations of the magnet N' will start, stop and reset the instruments $P_2$, $A_2$ and $S_2$.

The knot counter K comprises driving mechanism similar to that shown in Fig. 5 but inasmuch as there is only a single knot counter the mechanism is not duplicated as in Fig. 5. The driving gear of the knot counter, corresponding to the gear 52 in Fig. 5, is mounted on the forward end of the shaft 39 (Figs. 2 and 4) which is advanced one step at the end of each knot by the upward movement of carriage F. The mechanism of knot counter K is arranged to be started, stopped and reset by means of handle T mounted on the outer end of a shaft $t$ which is journaled in the front wall of casing C. On the inner end of shaft $t$ is fast an arm $t'$ adapted to engage the end of a bell-crank $t''$ which corresponds to bell-cranks 63 and 67 in Fig. 5.

The preferred electric circuit arrangement of my improved instrument is illustrated in Fig. 9 wherein certain of the parts already described are illustrated diagrammatically. The conductors 72 represent the leads of any suitable source of current. P and P' represent the port and starboard propeller shafts respectively. Mounted on the shafts P and P' are circuit-closing devices 73 and 73' which momentarily close the circuits of magnets M and M' through conductors 74 and 74' once for each revolution of the respective shafts. A manual switch 75 is provided in the common portion of the circuits 74 and 74' to render the instrument inoperative whenever desired. The magnets N and N', which actuate the bars 65 and 66 respectively as hereinbefore described, are connected to the current leads 72, through switch contacts 76, 77 and 78 and contacts 76', 77' and 78' respectively of a chronometer O, and to the constantly rotating hand 79 of the chronometer which is arranged to contact with the terminals 77, etc., in the course of its rotation. The contacts 76, 77 and 78 are connected together and thence to the magnet N through conductor 80. The terminals 76', 77' and 78' are connected together and thence to magnet N' through conductor 81. The hand 79 is connected to the opposite side of the source of current through conductor 82 and switch 75. During one revolution of the hand 79 the circuit through each of the magnets N and N' is momentarily closed three times. The bars 65 and 66 are so set by means of the buttons L and L' that the cycle of operation is as follows:

When the arm 79 engages contact 78 the upper set of instruments $P_1$, $A_1$ and $S_1$ is started; when the hand engages contact 76 the upper set of instruments is stopped; and when the hand engages contact 77 the upper set of instruments is reset preparatory to being started when the hand again reaches contact 78. The bar 66 is so set that the lower set of instruments $P_2$, $A_2$ and $S_2$ are started when the hand 79 engages contact 78', stopped when the hand engages contact 76', and reset when the hand engages contact 77'. Thus it will be seen that when hand 79 reaches its uppermost position the upper set of instruments $P_1$, $A_1$ and $S_1$ is set in operation and the lower set of instruments $P_2$, $A_2$ and $S_2$ is stopped; when the hand reaches contact 77' the lower set of instruments is reset; when the hand reaches lowermost position the lower set of instruments is started and the upper set of instruments is stopped; when the hand reaches contact 77 the upper set of instruments is reset; and when the hand again reaches uppermost position the upper set of instruments is started and the lowermost set again stopped. This cycle of operation continues so long as the switch 75 is closed. Thus it will be seen that the upper and lower sets of instruments function alternately so that one set of instruments counts revolutions during one interval of time, the other set of instruments counts revolutions during the next interval of time, and so on, While the interval of time may be made as large or as small as desired I prefer to make it one minute so that the indications of the instruments when stopped can more conveniently be made to represent revolutions per minute. In order to produce this result the hand 79 must make one revolution in two minutes. However, the indicators may be made to indicate revolutions per minute and yet be operatively connected to the propeller shafts for only a fraction of a minute by suitably proportioning the calibration of the indicators, the rate of revolution of the chronometer hand, and the speed ratio between the propeller shafts P and P' and the indicator shafts S and S'.

As shown at the top of Fig. 9 the magnet G is connected to the source of current through conductors 83, ring 46, arm 50, arm 41 and gear 34. There may also be provided a branch circuit 84 for the magnet G arranged to be manually controlled by a switch 85. The magnet H is arranged to be energized over conductors 86 and the circuit closer 21—23 hereinbefore described.

The operation of my improved system is as follows: The switch 75 (Fig. 9), if not already opened, is opened preparatory to setting the various portions of the instrument in zero position. The sleeve 18 on the shaft S" is set in zero position with the arm 21 extending vertically upwardly by means of the button B and the pawl and ratchet mechanism 25—28. The carriage F is lifted into uppermost position by closing switch 85 (Fig. 9) and thereby energizing magnet G. The carriage is held in uppermost position by the dog 43 (Fig. 4) and the gear 34 and arm 41 are moved into the zero position (shown in Fig. 3) by means of the spring 35 when the gear 34 is lifted out of engagement with the gear 42 on the shaft S". After the carriage F has been lifted in the manner described the switch 85 is opened and left open so that the magnet G may thereafter be automatically controlled as will hereinafter be described.

Before setting the instrument into operation the indicators are reset as follows: The chronometer hand is moved to and held upon contacts 76' and 78 while the revolution counters are set in zero position, the switch 75 is then closed and the chronometer hand 79 is released. Upon the closing of switch 75 while the chronometer hand was on contacts 76' and 78 both sets of revolution counters were started. After the instrument has been started as described the lower set of revolution counters $P_2$, $A_2$ and $S_2$ is stopped by pressing inwardly on button L' a single time. When the chronometer hand reaches contact 77' the lower set of instruments $P_2$, $A_2$ and $S_2$ is reset. When the hand reaches contacts 76 and 78' the lower set of instruments is started and the upper set is stopped. When the hand reaches contact 77 the upper set is reset, and when the hand reaches contacts 76' and 78 the upper set is started and the lower set is stopped. Thus the upper and lower sets of instruments operate during alternate minutes, one set of instruments being started at the moment the other set is stopped. By referring again to Fig. 5 it will be understood that the indicators are started by connecting them to the corresponding shafts S, S' and S''' (Fig. 2) and that they are stopped by disconnecting them from these shafts. Inasmuch as the shafts S, S' and S''' rotate continuously at velocities corresponding to the velocities of the port propeller, the starboard propeller, and the average speed of the two propellers, respectively, the indicators $P_1$ and $P_2$ which are alternately connected to the shaft S alternately count the revolutions of the port propeller, the indicators $S_1$ and $S_2$ which are alternately connected to the starboard propeller shaft S' alternately count the revolutions of the starboard propeller and the indicators $A_1$ and $A_2$ which are alternately connected to the shaft S''' alternately count the average revolutions of the two propellers.

After the instrument has been started in the manner above described, the circuit-making devices 73 and 73' on the port and starboard propeller shafts, respectively, immediately begin to send impulses through the magnets M and M' at rates proportional to the velocities of the port and starboard propellers. The magnets M and M' rotate the shafts S and S', respectively, through the medium of the pawl and ratchet mechanisms 4—11 and 4'—11' at velocities proportional to the velocities of the port and starboard propellers, respectively; hence the magnets M and M' together with their circuits and connections serve as electric synchronizers between the propeller shafts and shafts S and S' respectively. The shaft S'' is rotated at a velocity proportional to the average velocity of the port and starboard propellers through the medium of gears 12—14 and 12'—14', respectively, and the arm 16 carrying the differential gear 17. The shaft S''' is also rotated at a velocity proportional to the average velocity of the two propellers through gears 90 and 91 connecting shafts S'' and S''' together. It will be understood that the shafts S, S', S'' and S''' rotate without interruption while the instrument is in operation. The sleeve 18 is clamped on shaft S'' by means of screw 20 (Fig. 6) so as normally to be carried around by the shaft S'' but so as to slide on the shaft when it meets with opposition. Thus when the shaft S'' is set in rotation by closing the switch 75 the sleeve 18 rotates with the shaft. The arm 21 on sleeve 18 which had been set into position to point vertically upwardly, travels around in a counter-clockwise direction. Just before it has completed one revolution the arm 21 engages the switch contact 23 thereby momentarily closing the circuit of magnet H (Fig. 9). The energization of magnet H trips the catch 43 and permits the carriage F to fall into lowermost position where the gear 34 engages the gear 42 and the arm 40 moves into the path of the arm 21. When the gear 34 engages gear 42 the gear 34 is set into rotation by the gear 42. After the arm 21 has passed the spring 23 magnet H is de-energized and the catch 43 is moved into holding position by the spring 45. When the arm 21 has completed one revolution it engages the arm 40 on carriage F, which was moved into the path of the arm 21 when the carriage F was dropped. After the arm 21 has come into engagement with the arm 40 the rotation of the sleeve 18 is stopped, the sleeve thereafter sliding on the shaft S''. However, the gear 34 and arm 41 continue to rotate until the arm 41 engages the arm 50.

When the arm 41 engages the arm 50 the circuit of magnet G is closed and the carriage F is lifted into uppermost position where it is held by the catch 43. When the carriage is lifted the arm 21 on sleeve 18 is released from arm 40 on carriage F, permitting sleeve 18 to resume its rotation with shaft S''. Also when the carriage F is lifted the gear 34 and arm 41 are restored to initial position by spring 35. After the arm 21 on sleeve 18 has almost completed one revolution it again closes the circuit of magnet H, thereby dropping carriage F, and upon completing this revolution it is again stopped by the arm 40.

Inasmuch as the gear 34 is driven from the shaft S'' it is driven at a rate proportional to the average velocity of the port and starboard propellers. The gear 34 is therefore, in fact, a counter of the average revolutions of the two propellers. By setting the pointer I carrying arm 50 at point 1000 on the scale V (Fig. 1) the disk 34 will count 1000 average revolutions and then be restored to its initial position as above described. By setting the pointer I to the point on the scale V corresponding to the number of average revolutions of the propellers which will drive the ship one knot at a given velocity the gear 34 will be restored to initial position at the end of every knot. Thus by connecting the carriage F, which is lifted at the end of every knot, to the knot indicator K through the medium of pawl 37 and ratchet 38 the indicator K will indicate the knots travelled by the ship. If it becomes necessary to change the velocity of the ship the pointer I is shifted to the point on scale V corresponding to the number of average revolutions which is required to drive the ship a knot at the new velocity. In this way the knot indicator may be adjusted to any velocity within the range of the instrument which would in practice be designed to include all the velocities which would ordinarily be used.

It will be observed that in the embodiment of my invention illustrated in Figures 1 to 9 the arm 41 is not returned to zero position at the end of a knot, but is only returned to a position slightly in the rear of a point Z corresponding to 600 revolutions per knot. When thus arranged the friction sleeve 18 is arranged to operate as above described during the interval of time which would be required for the arm 41 to move from zero position to the position Z if the scale V were extended to zero. The arm 41 is set in operation a short interval of time before the pointer 21 on sleeve 18 has completed its revolution, viz., the time required for the arm 21 to travel from the electrical contact 23 to the arm 40; and the parts are so adjusted, with the arm 41 somewhat in the rear of position Z when at rest, that the arm 41 will reach point Z at the instant that arm 21 has completed one revolution and is stopped by arm 40. Thus the sleeve 18 rotates during the interval of time which would be required for the arm 41 to travel from zero position to point 600 if the scale V were extended to zero, the sleeve then stops, and the arm 41 takes up the rotation.

Thus it will be apparent that the operation of the instrument is essentially the same as if the arm 41 were each time returned to zero instead of to point 600. The following advantages inter alia are gained by this arrangement. The scale V is shortened by 600 divisions and the instrument can therefore be made much smaller. Moreover no time is lost in returning the arm 41 to its initial position inasmuch as the sleeve 18 begins to rotate at the moment the arm 41 reaches the desired point on the scale and the arm 41 is returned to its initial position while the sleeve 18 is counting revolutions. Obviously the scale V need not necessarily terminate at point 600 but may be carried down to the lowest velocity at which the ship upon which the instrument is to be used would ordinarily be driven.

In Fig. 10 I have shown a system which differs from the system shown in Fig. 9 in that the gear 34' is restored to zero position at the end of each knot instead of to an intermediate position Z as in Fig. 9, the scale V being extended to zero in this case. With this arrangement the friction sleeve 18 and associated parts are eliminated and the circuit for magnet H' is closed by the arm 41' when the gear 34' has been restored to zero position. The circuit for magnet G' is controlled by the arm 41' and the arm 50' in the same way as in Fig. 9. The arm 50' is set at a point corresponding to the number of average revolutions required to drive the ship one knot at the desired velocity. When the instrument is set in operation by closing switch 75' the gear 34' begins to rotate and continues to rotate until the arm 41' engages the arm 50' whereupon the magnet G' is energized to lift the gear 34' from the driving gear 42 on the shaft S'' (Fig. 4). The gear 34' is latched in its elevated position a moment while being returned to zero position. When the gear 34' reaches zero position arm 41' closes the circuit of magnet H' through contact 93 thereby dropping the gear 34' into engagement with its driving gear 42 whereupon the above described operation is repeated.

In order to measure fractions of knots the arm 41' may be rendered visible as e. g. by making the front of the casing C transparent in the region of scale V so that the arm 41' will indicate on scale V at any instant the number of average revolutions made since the end of the last complete knot. Since the number of average revolutions at any instant is proportional to the distance travelled on the new knot the distance is thus determined.

In the embodiment illustrated in Figs. 1 to 9 the sleeve 18 and associated parts constitute means for compensating for the time required for the oscillatory member 41 to return from stopping position to starting position inasmuch as these parts begin to function the moment the oscillatory member reaches stopping position and continue to function until such time as the oscillatory member is returned to starting position, started again, and then reaches a predetermined point (point 600 on scale V), the starting of the oscillatory member being so timed that it reaches said predetermined point at the same instant it would if it were instantaneously returned to zero position and instantaneously started again. In the modification illustrated in Fig. 10, where the oscillatory member is returned to zero position instead of to an intermediate position, the time required for the oscillatory member to return from stopping position to starting position may likewise be compensated for as illustrated in Figs. 12 and 13.

Referring to Figs. 12 and 13, I' is a pointer corresponding to pointer I in Fig. 4, 49' is an arm corresponding to arm 49 in Fig. 4, and 48' is a shaft for supporting pointer I and the arm 49' on the front wall of casing C as in Fig. 4. On the shaft 48' is fast a cam 95 which cooperates with an arm 97. The arm 97 is pivotally mounted intermediate its ends on casing C by a pin 98 and is held in contact with cam 95 at one end by means of spring 96. The other end 93' of the arm, which is insulated from the rest of the arm at 51'', is bent into parallelism with the circular wall C'' of the casing and contacts with a short circular conductor 93'' mounted on the circular wall of the casing. Conductor 93'' is mounted on the casing concentrically with pin 98 and is insulated from the casing in the same way as conductor 46 in Fig. 4. Conductor 93'' is connected to magnet H' in the same way that contact 93 is connected in Fig. 10, and when arm 41' (Fig. 10) contacts with arm 93' (Figs. 12 and 13) magnet H' is energized in the same way as when the arm 41' contacts with contact 93 in Fig. 10.

Inasmuch as the cam 95 is mounted on the same shaft as pointer I' it rotates with the pointer when the pointer I' is moved over scale V to the proper point. This movement of cam 95 produces a corresponding movement of arm 93' through the medium of arm 97. The cam 95 is shaped so that when the pointer I' is in zero position the arm 93' will also be in zero position, i. e. in the same relative position as the fixed contact 93 in Fig. 10, and so that when the pointer I' is advanced from zero position along scale V arm 93' will likewise be advanced at a proportionate rate sufficient to effect the aforesaid compensation. Thus when arm 41' (Fig. 10) oscillates between contacts 50' and 93' (Figs. 12 and 13) it will not return entirely to zero position at the end of each oscillation but only to the advanced position of arm 93'; and the arm 93' will have been advanced by cam 95 to such position that this reduction in the amplitude of oscillation will just compensate for the time which would otherwise be lost in returning arm 41' from maximum position to zero position. Inasmuch as the arm 93' is controlled by pointer I', through the medium of cam 95 and arm 97, the setting of pointer I' for a given speed of the ship propelling means adjusts arm 93' as well as arm 50'.

The use of an oscillatory member such as the arm 41 has peculiar advantages which render it superior to other devices that might be used. By making the arc across which the arm swings of sufficiently large radius very fine gradations in the setting of pointer I which controls the position of contact 50 are possible. In addition, the necessity of complicated speed change mechanism is entirely avoided. A fixed gear ratio is provided in the mechanism which actuates the arm 41 and the duration of its actuation is determined by the position of contact 50, through which the electrical circuit is closed to elevate carriage F and disconnect the gears. Thus the operative ratio between the driving mechanism (for example, the average speed shaft S") and the distance indicator K may be varied at will simply by changing the position of contact 50, thereby to vary the amplitude of oscillation of the oscillatory member 41.

In certain aspects the invention is applicable to stationary apparatus as well as to apparatus for propelling ships (air-craft, motor vehicles, etc.); for example, the speed counters may be employed to indicate the operation of each of a plurality of machines or machine elements and the average operation of all the elements.

I claim:—

1. A device for measuring the motion of a self-propelled ship comprising speed-controlled means operative in proportion to the speed of the ship-propelling means, an indicator, and electrical means operatively connecting said speed-controlled means with said indicator, said electrical means comprising a circuit including a variable electromagnetic controller, whereby the operative relationship between said speed-controlled means and said indicator may be varied.

2. A device for measuring the motion of a self-propelled ship comprising speed-controlled means operatively connected to the ship-propelling means to be constantly rotated at a velocity proportional to the velocity of said propelling means, an indicator, driving means operatively connecting said speed-controlled means with said indicator, said driving means including gearing having a fixed speed ratio, and regulating means for varying the operative ratio between said driving means and said indicator.

3. A ship's instrument comprising an oscillatory member, means operative in response to the ship's propelling means for oscillating said member, and means for varying the amplitude of oscillation of said member to vary the ratio between the rate of oscillation of said member and the rate of revolution of said propelling means.

4. A ship's instrument comprising an oscillatory member, means operative in response to the ship's propelling means for oscillating said member at a rate proportional to the speed of said propelling means, and means for varying the amplitude of oscillation of said member.

5. A ship's instrument comprising a member arranged to oscillate between an initial starting position and a variable stopping position, means for recurrently moving said member from said starting position to said stopping position at a velocity proportional to the speed of the ship-propelling means, and an indicator controlled by said member.

6. A ship's instrument comprising a member arranged to oscillate between an initial starting position and a variable stopping position, means for recurrently moving said member from said starting position to said stopping position at a velocity proportional to the speed of the ship propelling means, and an indicator arranged to be intermittently actuated once for each oscillation of said member.

7. A ship's instrument comprising a member arranged to move along a scale calibrated in terms of the number of revolutions of the propelling means required to drive the ship a certain distance at different speeds, and means for moving said member along said scale at a rate proportional to the velocity of the propelling means.

8. A ship's instrument comprising a member arranged to oscillate between an initial starting position and a variable stopping position, means for recurrently moving said member from said starting position to said stopping position at a velocity proportional to the speed of the ship propelling means, and means for compensating for the time required for said member to return from said stopping position to said starting position.

9. A ship's instrument comprising a member arranged to oscillate between an initial starting position and a variable stopping position, and means controlled by the ship's propelling means for recurrently oscillating said member between said two positions once for each predetermined number of revolutions of the propelling means.

10. A ship's instrument comprising two movable members, and means controlled by the ship's propelling means for successively moving said members through predetermined distances during the interval of time required to rotate the propelling means a certain number of revolutions at a certain speed, one of said members being movable during the first portion of said interval of time and the other of said members being movable during the latter portion of said interval of time, and electromagnetic means controlled by the movement of said members for automatically starting and stopping the members.

11. A ship's instrument comprising two movable members, means controlled by the ship's propelling means for successively moving said members through predetermined distances during the interval of time required to rotate the propelling means a certain number of revolutions at a certain speed, one of said members being movable during the first portion of said interval of time and the other of said members being movable during the latter portion of said interval of time, and means controlled by said first member for starting said second member.

12. A ship's instrument comprising a rotary member and an oscillatory member, and means for alternately actuating said members in response to the speed of the ship's propelling means so that the motion of said members is indicative of the progress of the ship.

13. A ship's instrument comprising a rotary member and an oscillatory member, and means for actuating each of said members once during the interval of time required to rotate the propelling means a certain number of revolutions at a certain speed, the rotary member being actuated during the first portion of said interval and the oscillatory member being actuated during the latter portion of said interval, whereby the motion of said members is indicative of the progress of the ship.

14. A ship's instrument comprising a rotary member and an oscillatory member for indicating the progress of a ship, means for actuating each of said members once during the interval of time required to rotate the propelling means a certain number of revolutions at a certain speed, the rotary member being actuated during the first portion of said interval and the oscillatory member being actuated during the latter portion of said interval, and means for starting the rotary member simultaneously with the stopping of the oscillatory member.

15. A ship's instrument comprising a rotary member and an oscillatory member for indicating the progress of a ship, and means for actuating each of said members once during the interval of time required to rotate the propelling means a certain number of revolutions at a certain speed, the rotary member being actuated during the first portion of said interval and the oscillatory member being started by said rotary member at the end of the rotation of the rotary member.

16. A ship's instrument comprising a rotary member and an oscillatory member for indicating the progress of a ship, means for actuating each of said members once during the interval of time required to rotate the propelling means a certain number of revolutions at a certain speed, each member starting approximately at the time the other member stops, and means for returning said oscillatory member while the rotary member is rotating.

17. A ship's instrument comprising speed-controlled means operative in proportion to the speed of the ship-propelling means, an oscillatory member arranged to be moved in one direction by said speed-controlled means, and means to disconnect said member from said speed-controlled means after the member has been moved a predetermined distance and to return the member to initial position.

18. A ship's instrument comprising speed-controlled means operative in proportion to the speed of the ship-propelling means, an oscillatory member arranged to be moved in one direction by said speed-controlled means, and means operative after said member has been moved a predetermined distance for disconnecting the member from said speed-controlled means, returning the member to initial position, and then again connecting the member with the speed-controlled means.

19. A ship's instrument comprising speed-controlled means operative in proportion to the speed of the ship-propelling means, an oscillatory member arranged to be moved in one direction by said speed-controlled means, means operative after said member has been moved a predetermined distance for disconnecting the member from said speed-controlled means, means for returning the member to initial position, and means for again connecting said member to said speed-controlled means at the end of a definite number of revolutions of said speed-controlled means.

20. A ship's instrument comprising speed-controlled means operative in proportion to the speed of the ship-propelling means, an oscillatory member arranged to be moved in one direction by said speed-controlled means, means operative after said member has been moved a predetermined distance for disconnecting the member from said speed-controlled means, means for returning the member to initial position, and means arranged to be set in motion by said speed-controlled means when said member is disconnected from the speed-controlled means for again connecting said member to said speed-controlled means at the end of a definite number of revolutions of said speed-controlled means.

21. A ship's instrument comprising speed-controlled means operative in proportion to the speed of the ship-propelling means, an oscillatory member arranged to be moved in one direction by said speed-controlled means, means operative after said member has been moved a predetermined distance for disconnecting the member from said speed-controlled means, means for returning the member to initial position, means arranged to be set in motion by said speed-controlled means when said member is disconnected from the speed-controlled means for again connecting said member to said speed-controlled means at the end of a definite number of revolutions of said speed-controlled means, and means for arresting the motion of said last means while said member is connected to said speed-controlled means.

22. A ship's instrument comprising speed-controlled means operative in porportion to the speed of the ship-propelling means, an oscillatory member arranged to be moved in one direction by said speed-controlled means, a rotary member arranged to be rotated in one direction by said speed-controlled means, and means controlled by said oscillatory member for arresting the motion of said rotary member, the motion of said members being indicative of the progress of the ship.

23. A ship's instrument comprising speed-controlled means operative in proportion to the speed of the ship-propelling means, an oscillatory member arranged to be moved in one direction by said speed-controlled means, a rotary member arranged to be rotated in one direction by said speed-controlled means, and means controlled by said oscillatory member for rendering the rotary member inoperative during a portion of the time that the oscillatory member is moving, the motion of said members being indicative of the progress of the ship.

24. A ship's instrument comprising speed-controlled means operative in proportion to the speed of the ship-propelling means, an oscillatory member arranged to be moved in one direction by said speed-controlled means, a rotary member arranged to be rotated in one direction by said speed-controlled means, means controlled by said oscillatory member for disconnecting the oscillatory member from said speed-controlled means, and means for returning said oscillatory member to initial position, the motion of said members being indicative of the progress of the ship.

25. A ship's instrument comprising speed-controlled means operative in proportion to the speed of the ship-propelling means, an oscillatory member arranged to be moved in one direction by said speed-controlled means, a rotary member arranged to be rotated in one direction by said speed-controlled means, means controlled by said oscillatory member for disconnecting the oscillatory member from said speed-controlled means, and means controlled by said rotary member for connecting the oscillatory member to the speed-controlled means, the motion of said members being indicative of the progress of the ship.

26. A ship's instrument comprising speed-controlled means operative in proportion to the speed of the ship-propelling means, an oscillatory member arranged to be moved in one direction by said speed-controlled means, a rotary member arranged to be rotated in one direction by said speed-controlled means, means controlled by said oscillatory member for disconnecting the oscillatory member from said speed-controlled means, and means controlled by said oscillatory member for arresting the motion of said rotary member while the oscillatory member is connected to said speed-controlled means, the motion of said members being indicative of the progress of the ship.

27. A ship's instrument comprising speed-controlled means operative in proportion to the speed of the ship-propelling means, an oscillatory member arranged to be moved in one direction by said speed-controlled means, a rotary member arranged to be rotated in one direction by said speed-controlled means, means controlled by said oscillatory member for disconnecting the oscillatory member from said speed-controlled means, and means controlled conjointly by said oscillatory and rotary members for stopping and starting said rotary member at the beginning and end respectively of each oscillation of said oscillatory member, the motion of said members being indicative of the progress of the ship.

28. A ship's instrument comprising speed-controlled means operative in proportion to the speed of the ship's propelling means, an oscillatory member arranged to be oscillated by said speed-controlled means at a rate proportional thereto, said parts being so arranged that said oscillatory member makes one oscillation for a predetermined number of revolutions of said speed-controlled means, and means for regulating said parts to vary the number of revolutions of said speed-controlled means corresponding to one oscillation of said oscillatory member.

29. A ship's instrument comprising speed-controlled means operative in proportion to the speed of the ship-propelling means, an oscillatory member arranged to be moved in one direction by said speed-controlled means, means operative after said member has been moved a predetermined distance for disconnecting the member from said speed-controlled means, means for returning said member to initial position, means for again connecting said member to said speed-controlled means at the end of a definite number of revolutions of said speed-controlled means, said parts being so arranged that said oscillatory member makes one oscillation for a predetermined number of revolutions of said speed-controlled means, and means for varying the amplitude of oscillation of said oscillatory member to vary the number of revolutions of said speed-controlled means corresponding to one oscillation of said oscillatory member.

30. A ship's instrument comprising speed-controlled means operative in proportion to the speed of the ship-propelling means, mechanism actuated by said means for indicating the speed of the propelling means, and intermittent mechanism actuated by said means for indicating the distance traveled by the ship.

31. A ship's instrument comprising speed-controlled means operative in proportion to the speed of the ship propelling means, mechanism actuated by said means for indicating the speed of the propelling means, and oscillatory mechanism actuated by said means for indicating the distance traveled by the ship, said last mechanism being adjustable to different speeds of said propelling means.

32. A ship's instrument comprising propeller speed-controlled means operative in proportion to the speed of each of the ship propellers, average speed-controlled means operative in proportion to the average speed of all of the ship's propellers, mechanism actuated by said second means for indicating the average speed of all of the propellers, and mechanism actuated by said second means for indicating the distance traveled by the ship at any speed of the propellers within a predetermined range, said last mechanism having alternately operating parts.

33. A ship's instrument comprising propeller speed-controlled means operative in proportion to the speed of each of the ship propellers, average speed-controlled means operative in proportion to the average speed of all of the ship's propellers, mechanism actuated by said first means for indicating the speed of each of the ship's propellers, mechanism actuated by said second means for indicating the average speed of all of the propellers, and mechanism actuated by said second means for indicating the distance traveled by the ship at any speed of the propellers within a predetermined range, said last mechanism having alternately operating parts one of which is arranged to be recurrently started and stopped by the other part.

34. A ship's instrument comprising an indicator for indicating the speed of each of the ship propellers, an indicator for indicating the average speed of all of the ship propellers, an indicator for indicating the distance traveled by the ship, and means common to said indicators for actuating same from the ship propelling means, said distance indicator comprising an oscillatory member whose range of oscillation is adjustable to the speed of the ship.

35. A ship's instrument comprising an indicator for indicating the speed of the ship propelling means, an indicator for indicating the distance traveled by the ship, and means common to said indicators for actuating same, said distance indicator comprising an oscillatory member whose period of oscillation is adjustable to the speed of the ship.

36. A ship's instrument comprising an indicator for indicating the speed of the ship propelling means, an oscillatory indicator for indicating the distance traveled by the ship, said indicator being adjustable to different speeds of said propelling means, and means common to said indicators for actuating same.

37. A ship's instrument comprising an indicator for indicating the average speed of all the ship propellers, an oscillatory indicator for indicating the distance traveled by the ship, and means including a differential connection to the various ship propellers for actuating said indicators.

38. A ship's instrument comprising an indicator for indicating the average speed of all the ship propellers, an indicator for indicating the distance traveled by the ship, both of said indicators being remote from the ship propelling means, and means for actuating said indicators from the ship propelling means, said electrical means including electromagnetic apparatus for actuating the indicators proportionately to each other and to the propelling means at any speed of the latter.

39. A ship's instrument comprising propeller speed-controlled means individual to each ship propeller, average speed-controlled means common to the ship propellers, electrical means including electrical synchronizers for driving said propeller speed-controlled means in synchronism with the corresponding propellers respectively, and differential means connecting said average speed-controlled means to said propeller speed-controlled means respectively.

40. A ship's instrument comprising propeller speed-controlled means individual to each ship propeller, average speed-controlled means common to the ship propellers, both of said means being remote from the ship propellers, electrical means including electrical synchronizers for driving said propeller speed-controlled means in synchronism with the corresponding propellers respectively, and distance and speed indicators associated with said average speed-controlled means.

41. A ship's instrument comprising propeller speed-controlled means individual to each ship propeller, average speed-controlled means common to the ship propellers, both of said means being remote from the ship propellers, electrical means including electrical synchronizers for driving said propeller speed-controlled means in synchronism with the corresponding propellers respectively, a distance indicator associated with said average speed-controlled means, and speed indicators associated with said average speed-controlled means and each of said propeller speed-controlled means respectively.

42. A ship's instrument comprising an indicator remote from the ship propelling means, and electrical means for continuously actuating said indicator in synchronism with the ship's propelling means, said electrical means including electromagnetic apparatus synchronized with the ship propelling means.

43. A ship's instrument comprising propeller speed-controlled means individual to each of the ship propellers, electrical means including electromagnetic means synchronized with the ship propellers for actuating said speed-controlled means at rates proportional to the speeds of the propellers respectively, average speed-controlled means common to the ship propellers, and means controlled by said propeller speed-controlled means for actuating said average speed controlled means at a rate proportional to the average speed of all of the propellers.

44. A ship's instrument comprising speed-controlled means operative in proportion to the speed of the ship propelling means, an indicator associated with said means, and automatic mechanism for continuously connecting said indicator to said means, disconnecting said indicator from said means, and resetting said indicator to initial position.

45. A ship's instrument comprising speed-controlled means operative in proportion to the speed of the ship propelling means, an indicator associated with said means, mechanism for connecting said indicator to said means, disconnecting said indicator from said means, and resetting said indicator, and means for actuating said mechanism either automatically or manually.

46. A ship's instrument comprising speed-controlled means operative in proportion to the speed of the ship propelling means, a pair of revolution counters associated with said means, means for alternately connecting and disconnecting the counters of said pair with said speed-controlled means, means for automatically resetting said counters after being disconnected from said speed-controlled means, and means for manually starting, stopping and resetting said counters.

47. A ship's instrument comprising a plurality of speed-controlled means operative in proportion to the speed of the ship propellers respectively, a pair of indicators associated with each of said means, and mechanism common to said pairs of indicators for alternately connecting and disconnecting the indicators of each of said pairs to and from said speed-controlled means and for resetting the indicators.

48. A ship's instrument comprising a plurality of speed-controlled means operative in proportion to the speed of the ship propellers respectively, a pair of indicators associated with each of said means, mechanism common to said pairs of indicators for alternately connecting and disconnecting the indicators of each of said pairs to and from said speed-controlled means and for resetting the indicators, and means for actuating said mechanism either automatically or manually.

49. An instrument for indicating the operation of a machine, said instrument comprising means operative in proportion to the speed of the machine, an indicator, mechanism for continuously moving said indicator during regular recurrent intervals of time, whereby the indicator is moved from an initial position over a range proportional to the machine speed during each of the time intervals, and means for retaining the indicator in its final position during a regular interval of time following each of the first named time intervals.

50. An instrument for indicating the operation of a machine, said instrument comprising means operative in proportion to the speed of the machine, an indicator, mechanism for continuously moving said indicator during regular recurrent intervals of time, whereby the indicator is moved from an initial position over a range proportional to the machine speed during each of the time intervals, and means for retaining the indicator in its final position during a regular interval of time following each of the first named time intervals, and then resetting the indicator in its initial position before the beginning of the next time interval in which it is adapted to be moved by the said mechanism.

51. An instrument for indicating the operation of a plurality of machine elements comprising speed-controlled means individual to each element, electrical means including electromagnetic means synchronized with the said elements for actuating said speed-controlled means at rates proportional to the speeds of the elements respectively, and average speed-controlled means arranged to be actuated by said speed-controlled means at a rate proportional to the average speed of all of the elements.

52. An instrument for indicating the operation of a machine comprising means operative in proportion to the speed of the machine, an indicator associated with said means, mechanism for continuously connecting said indicator to said means, disconnecting said indicator from said means, and resetting said indicator to initial position, and means for automatically actuating said mechanism at recurrent intervals.

53. An instrument for indicating the operation of a machine comprising means operative in proportion to the speed of the machine, a plurality of indicators associated with said means, and mechanism for continuously connecting the indicators alternately with said means at recurrent intervals of time.

54. An instrument for indicating the operation of a machine comprising means operative in proportion to the speed of the machine, a plurality of indicators associated with said means, mechanism for continuously connecting the indicators alternately with said means at recurrent intervals of time, and means for automatically controlling said mechanism.

55. An instrument for indicating the operation of a machine comprising means operative in proportion to the speed of the machine, a pair of indicators associated with said means, means for continuously connecting and disconnecting the indicators of said pair alternately to and from said first means, and means for automatically resetting each indicator after being disconnected from said first means.

56. An instrument for indicating the operation of a plurality of machine elements comprising means operative in proportion to the operation of each of said elements, a pair of indicators associated with each of said means, and automatic mechanism common to said pairs of indicators for alternately connecting the indicators of each of said pairs with said first means at predetermined intervals of time.

57. An instrument for indicating the operation of a plurality of machine elements comprising means operative in proportion to the operation of each of said elements, a pair of indicators associated with each of said means, and automatic mechanism common to said pairs of indicators for alternately connecting the indicators of each of said pairs with said first means and for resetting the indicators.

58. An instrument for indicating the operation of a plurality of machine elements comprising means operative in proportion to the speed of each element, a pair of indicators associated with each of said means, mechanism common to said pairs of indicators for alternately connecting and disconnecting the indicators of each of said pairs to and from said means and for resetting the indicators, and means for automatically actuating said mechanism at recurrent intervals.

59. An instrument for indicating the operation of a plurality of machine elements comprising means operative in proportion to the operation of each element, means operative in proportion to the average operation of all the elements, an indicator associated with each of said means, and mechanism for connecting said indicators to said means, disconnecting the indicators from said means, and resetting said indicators.

60. An instrument for indicating the operation of a plurality of machine elements comprising means operative in proportion to the operation of each element, means operative in proportion to the average operation of all the elements, a pair of indicators associated with each of said means, and mechanism for alternately connecting the indicators of said pairs with said means.

Signed by me at Boston, Massachusetts this 27th day of January, 1919.

GEORGE WALKER.